Feb. 12, 1946.  N. E. PEERY  2,394,803
ISOMERIZATION OF HYDROCARBONS
Filed Jan. 30, 1942
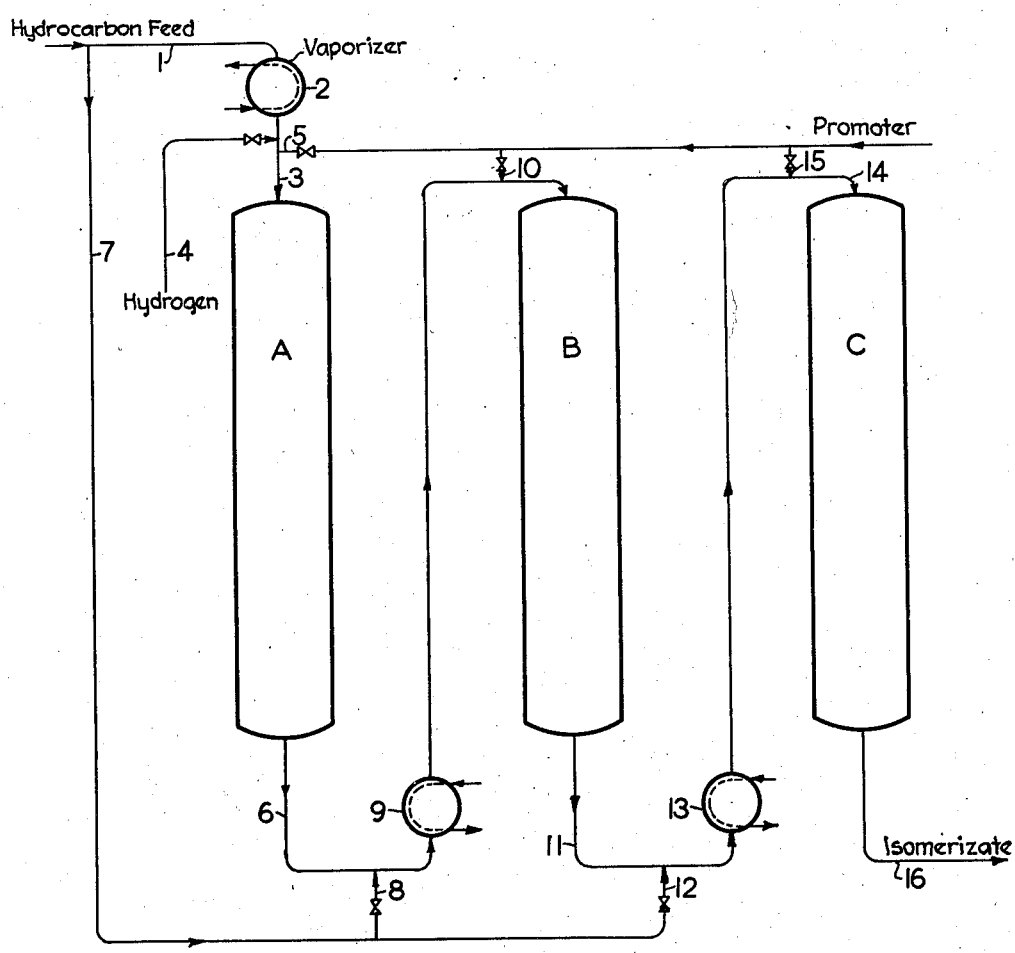
Inventor: Norman E. Peery
By his Attorney:

Patented Feb. 12, 1946

2,394,803

UNITED STATES PATENT OFFICE 2,394,803

ISOMERIZATION OF HYDROCARBONS

Norman E. Peery, San Francisco, Calif., assignor to Shell Development Company, San Francisco, Calif., a corporation of Delaware Application January 30, 1942, Serial No. 428,858

7 Claims. (Cl. 260—683.5)

This invention relates to an improvement in the isomerization of isomerizable saturated hydrocarbons with the aid of catalysts of the Friedel-Crafts type. A particular aspect of the invention relates to the vapor phase isomerization of normal butane to isobutane with the aid of supported aluminum chloride and/or aluminum bromide catalysts.

It has long been known that various saturated hydrocarbons, when contacted with certain catalysts of the Friedel-Crafts type, undergo isomerization reactions. In view of the great demand for paraffin hydrocarbons having branched chain structures such, in particular, as isobutane, isopentane, isohexane, neohexane, etc., a great deal of work has been done in an attempt to utilize these isomerization reactions for the production of these desired hydrocarbons from their relatively abundant normal isomers. The various processes which have been proposed for these isomerizations may be divided into two distinct classes—those in which the isomerization reaction is effected while the hydrocarbon is in the liquid phase and those in which the isomerizations reaction is effected with the hydrocarbon in the vapor phase. In certain cases, especially when treating higher boiling products such as straight run gasoline fractions, the liquid phase process is preferred. Operation in the liquid phase, however, has, in general, certain disadvantages, and vapor phase operation is usually preferred for commercial operation in such cases where it is applicable.

In the vapor phase process the hydrocarbon or mixture of hydrocarbons to be isomerized is vaporized and the vapors are passed under known suitable conditions through a fixed bed of solid catalyst of the Friedel-Crafts type. Very effective active and selective catalysts for this purpose have been developed. The preferred catalysts comprise an isomerizing aluminum halide such as aluminum chloride and/or aluminum bromide in intimate association with a relatively non-active support. Suitable materials which are combined with aluminum chloride and/or aluminum bromide comprise the various adsorptive mineral carrier substances such as the various active clays, active metal gels, active carbon, and the like. Especially suitable carrier materials to be combined with aluminum chloride and/or aluminum bromide to produce highly active and selective catalysts for catalytic isomerization of hydrocarbons are activated alumina alpha monohydrate, activated gamma alumina, mixtures of these two aluminas, and activated bauxite.

The present practice is to employ these various catalysts in fixed beds disposed in suitable reaction converters through which the hydrocarbon vapors, along with a small amount of hydrogen halide promoter, are passed under known isomerizing conditions. The conversion per pass gradually declines upon the continued use of the catalyst bed and when the conversion per pass has declined to an arbitrarily set minimum, the catalyst is discarded and the converter is filled with fresh catalyst. In some cases, in order to take advantage of the pre-refining action of the spent catalyst and to obtain the maximum catalyst life, two or more catalytic converters are employed in series and the flow is so arranged that the hydrocarbon feed contacts the oldest most nearly spent catalyst first and the freshest catalyst last.

One of the chief difficulties encountered in the practical isomerization of these various isomerizable saturated hydrocarbons with these catalysts is the tendency for these catalysts to catalyze various side reactions such, in particular, as cracking of the hydrocarbons. This tendency is especially pronounced when treating normally liquid hydrocarbons. These various side reactions, generically termed "degradation reactions," are particularly detrimental in the catalytic isomerization of hydrocarbons and are to be avoided as far as possible. The degradation products from these side reactions not only contaminate the product but also contaminate the hydrogen halide promoter and render it unsuitable for recycling. The important disadvantage of degradation reactions, however, is that as soon as they become appreciable they cause a rapid decline in the catalyst activity. In order to avoid these degradation reactions or hold them at a minimum, several expedients are resorted to. One is the use of especially prepared selective catalysts. Another is by adjustment of the reaction conditions. A third is by the use of certain materials which have been found to repress the degradation reactions. In general, all three of these expedients are employed simultaneously. It is found that under certain conditions the presence of certain naphthenic hydrocarbons exerts a decided repressing effect upon the degradation of normal paraffin hydrocarbons under isomerizing conditions. In the isomerization of normally liquid hydrocarbons it is also found that the presence of large excesses of isobutane also exerts a repressing effect upon the degradation reactions. The most effective repressing agent so far found, however, is hydrogen.

In the vapor phase isomerization of hydrocarbons even quite small concentrations of hydrogen are sufficient to substantially eliminate degradation reactions. The reaction of hydrogen is, however, differential; that is, hydrogen represses not only the degradation reactions but the isomerization as well. The advantage of the use of hydrogen is therefore due to the relatively greater repressing effect on the degradation reactions when used in the proper concentrations and all hydrogen concentrations above those actually required to repress the degradation are very harmful. Thus, even 3%—4% by volume of hydrogen is sometimes sufficient to very severely repress the vapor phase isomerization reaction.

In the use of hydrogen to repress degradation in vapor phase isomerizations, it has been the practice hitherto to add the required amount of hydrogen to the hydrocarbon feed to be isomerized and to pass the mixture through a series of reactors, preferably containing catalyst in various stages of deactivation. In this conventional method of operation all of the catalyst is not used to best advantage and the maximum conversion and catalyst life are not realized. It has been found that the catalysts require varying concentrations of hydrogen throughout their active life and that if sufficient hydrogen is employed to repress degradation in that portion of the catalyst most prone to cause the degradation, the isomerization is unduly repressed in the remaining portions of the catalyst where such concentrations of hydrogen are not only unnecessary but highly detrimental.

It is furthermore found that contrary to expectation the tendency for the catalyst to cause degradation increases as the activity of the catalyst declines with use and is greatest with the most nearly spent catalyst. In fact, it has been found that after the catalyst has become almost entirely spent in the isomerization process it is still capable of effectively catalyzing hydrocarbon disproportionation—one of the most prevalent of the degradation reactions encountered. It is also found that the optimum amount of hydrogen to be used depends to a certain extent upon the type of catalyst employed.

I have now invented a new and improved method of operation whereby better results may be obtained. According to the process of the present invention, the isomerization is executed with a greater concentration of hydrogen in the first contacted bed of least active catalyst and a lesser concentration of hydrogen in the succeeding beds of more active catalyst. This condition is conveniently maintained according to the present process by feeding the required amount of hydrogen with a portion of the hydrocarbon to be isomerized into the first of the series of reactors containing catalyst of increasing activity and adding additional amounts of hydrocarbon containing no (or lesser amounts of) hydrogen to the effluent prior to entering the succeeding reactors of the series. In this method of operation the hydrogen concentration is greatest in the oldest least active catalyst and lowest in the freshest most active catalyst. Thus, there is a decreasing gradient of hydrogen concentration in the direction of flow.

The process of the present invention may be conveniently described in connection with an operation comprised within its scope. To assist in the description the attached flow diagram is provided which shows by means of conventional figures not drawn to scale an assembly of apparatus wherein the process may be conveniently executed. Referring to the drawing the hydrocarbon to be isomerized, for example butane, enters via line 1 and a portion thereof passes directly to a suitable vaporizer of conventional design 2. The vaporized hydrocarbon to be isomerized leaving the vaporizer 2 via line 3 is mixed with a suitable quantity of hydrogen entering via line 4. The amount of hydrogen entering via line 4 depends upon the hydrocarbon treated, the kind and condition of the catalyst, and the reaction conditions. The optimum concentration may be easily determined in practice since it is that concentration which will repress the degradation reactions without repressing the desired isomerization. Thus, a known excess may be employed at the start of the process and the concentration of hydrogen gradually decreased until degradation products just begin to appear in the product. Thus, in the isomerization of butane at 100° C.–120° C. under 10–15 atmospheres pressure and at a space velocity of approximately 6–20 mols per liter per hour with an aluminum chloride-active alumina catalyst, the optimum hydrogen concentration usually is about 2%–5%. (All percentages of hydrogen referred to herein are mol percentages.) A small amount of a promoter such as HCl, HBr, HF, $BF_3$ or the like is preferably added to the incoming mixture of hydrocarbon and hydrogen via line 5. The mixture of hydrocarbon, hydrogen and promoter then passes through the first of a series of converters A, B, and C wherein it is contacted with the least active, most nearly spent catalyst. The product leaving reactor A via line 6, having passed through the least active catalyst in the presence of a substantial concentration of hydrogen, is only partially converted. The conversion may nevertheless be appreciably due to the fact that this part of the conversion where the hydrocarbon is furthest from the isomerization equilibrium is relatively easy to effect. In passing through converter A the hydrocarbon is also freed of traces of materials which are poisonous to the catalyst. This material treated in converter A has therefore a much smaller tendency to sludge the subsequent catalyst than the material entering via line 3. This is another reason for the use of decreasing gradients of hydrogen concentration in converters B and C. The catalyst in converter B is less spent and more active than that in converter A and requires a smaller hydrogen concentration. It is not only a case of not requiring as much hydrogen, but a case of the concentration of hydrogen which is effective in converter A being decidedly detrimental in converter B by suppressing the reaction, particularly since in the second reaction zone B a more difficult part of the reaction (approaching the equilibrium) is taking place. In order to decrease the concentration of hydrogen in converter B, additional butane is introduced into the effluent from converter A via lines 7 and 8. The mixture is again brought to the desired reaction temperature by means of heat exchanger 9 and passes through reactor B. Additional amounts of promoter may be added via line 10. The mixture leaving reactor B via line 11 is mixed with a further amount of fresh butane via lines 7 and 12 and again brought to the desired reaction temperature in heat exchanger 13. The mixture which contains a still lower concentration of hydrogen is then passed via line 14 after adding additional promotor via line 15 into reactor C, wherein it is contacted with the freshest most active catalyst. The effluent from reactor C is passed via line 16 to a conventional recovery unit wherein hydrogen halide promoter is removed. This mixture, in general, will contain less than about 2% of hydrogen, although in some cases somewhat higher concentrations can be tolerated.

While, for the purpose of illustration, the above description is directed to the isomerization of butane and this is a preferred embodiment of the invention, it is to be understood that the process is in no way limited to the treatment of this hydrocarbon. The process may be applied to the isomerization of any of the isomerizable saturated hydrocarbons which may be vaporized and treated below cracking temperatures. Thus, the process may be advantageously employed in the vapor phase isomerization of pentane, hexane, heptane, the methyl pentanes, the methyl hexanes, straight run gasoline fractions, and the like.

As noted above, the present process may be applied with any of the known isomerization catalysts. In the case of the above-described supported type catalysts consisting essentially of the catalytically active Friedel-Crafts type catalyst in combination with a relatively inert porous or adsorptive support, the effectiveness of the process is somewhat dependent upon the relative ratio of these components. Thus, in the case of catalysts consisting essentially of aluminum chloride in combination with an adsorptive alumina the process becomes more effective as the amount of aluminum chloride in the catalyst is increased. This is believed to be due to the presence of increasing quantities of aluminum chloride which is not firmly adsorbed in the carrier. Active aluminas, for instance, are generally capable of adsorbing only about 20%-25% by weight of aluminum chloride and all aluminum chloride above this amount is simply supported upon the surface and not firmly bound. Such catalysts containing more than adsorbable amounts of aluminum chloride may be said to be "supersaturated." "Supersaturated" isomerization catalysts are well known in the art. Catalysts prepared, for example, by liquid impregnation under pressure and by pilling are commonly of this type. It is found that there is a considerable difference in the characters of catalysts which are supersaturated and those which are not supersaturated. Thus, in the case of catalysts which are supersaturated, the change in hydrogen requirements with use is most pronounced. In the case of catalysts which contain only strongly adsorbed aluminum chloride, such as prepared by the vapor phase impregnation of the adsorptive carrier with aluminum chloride, the tendency to require increasing concentrations of hydrogen as the activity declines is not as pronounced. It is also noted that this latter type of catalyst often has a tendency to cause somewhat more degradation for a very short period when first used. Thus, when such catalysts are employed in the present process the method of starting the reaction with a known excess of hydrogen and then gradually reducing the hydrogen concentration, as described above, has the additional advantage of preventing deterioration of the fresh catalyst during the initial stages of operation.

While in the above I have described the process of the invention with particular reference to the isomerization plant illustrated in the attached drawing, it is to be understood that certain modifications will be readily apparent to those skilled in the art and that the process of the invention is not limited to the particular design of the several pieces of apparatus shown, nor to the flow indicated, except for the principles set forth in the above description and that all such modifications of the process flow and plant design which utilize said principles are considered to be within the spirit of the invention. For instance, instead of using three converters in series, two or more than three converters may be employed. Also, in practice the converters will be equipped with additional manifolding lines (not shown) whereby the hydrocarbon feed may be passed through the converters in any desired order. Thus, in practice when the conversion in converter A has decreased to an uneconomical figure this converter is preferably recharged with fresh catalyst and the feed changed to pass through converters B, C, and A, thereby maintaining the relative order of increasing activity. No importance is attached to the order of the addition of the materials to the feed. Thus, the feed added to the effluent from the first, second, etc. converters may be withdrawn from the main feed line either prior to or after the vaporizer 2. Also, it is immaterial in which order the hydrogen and promoter are introduced into the feed. Also, in some instances, if the converters A, B, and C are provided with suitable heating and/or cooling means such as jackets or the like, the heat exchangers 9 and/or 13 may be dispensed with.

I claim as my invention:

1. In an isomerization process wherein vapors of a saturated isomerizable hydrocarbon are passed under isomerizing conditions through a series of reaction zones containing a supported isomerization catalyst of the Friedel-Crafts type, the hydrocarbon passing through the least active catalyst first and then through catalyst of greater activity, the improvement which comprises maintaining in the hydrocarbon vapors passing through said reaction zones a decreasing gradient of hydrogen in the direction of flow.

2. In an isomerization process wherein vapors of a saturated isomerizable hydrocarbon are passed under isomerizing conditions through a series of reaction zones containing a supported isomerization catalyst of the Friedel-Crafts type, the hydrocarbon passing through the least active catalyst first and then through catalyst of greater activity, the improvement which comprises splitting the hydrocarbon feed to be isomerized into a plurality of portions, introducing one portion in admixture with hydrogen to the first reaction zone and introducing the remaining portions without added hydrogen into the effluent from the first reaction zone.

3. In an isomerization process wherein vapors of a saturated isomerizable hydrocarbon are passed under isomerizing conditions through a series of reaction zones containing a supported isomerization catalyst of the Friedel-Crafts type, the hydrocarbon passing through the least active catalyst first and then through catalyst of greater activity, the improvement which comprises introducing the hydrocarbon feed to be isomerized in admixture with hydrogen into the first reaction zone and introducing additional portions of the hydrocarbon to be isomerized into the effluent from the first reaction zone, whereby there is maintained in the series of reaction zones decreasing gradient of hydrogen concentration of the direction of flow.

4. In an isomerization process wherein vapors of butane are passed under isomerizing conditions through a series of reaction zones containing a supported isomerization catalyst of the Friedel-Crafts type, the butane passing through the least active catalyst first and then through catalyst of greater activity, the improvement which comprises maintaining in the butane vapors passing through said reaction zones a decreasing gradient of hydrogen concentration in the direction of flow.

5. In an isomerization process wherein vapors of a saturated isomerizable hydrocarbon are passed under isomerizing conditions through a series of reaction zones containing a supported aluminum chloride isomerization catalyst, the hydrocarbon passing through the least active catalyst first and then through catalyst of greater activity, the improvement which comprises maintaining in the hydrocarbon vapors passing through said reaction zones a decreasing gradient of hydrogen in the direction of flow.

6. Process according to claim 5 wherein the supported aluminum chloride isomerization catalysts in the series of reaction zones are supersaturated with aluminum chloride.

7. Process according to claim 1 wherein the hydrogen concentration in the feed to the first reaction zone is greater than 2% and the concentration of hydrogen in the effluent from the last reaction zone is less than 2%.

NORMAN E. PEERY.